(12) United States Patent
Tsujimoto

(10) Patent No.: US 8,650,859 B2
(45) Date of Patent: Feb. 18, 2014

(54) EXHAUST GAS PURIFICATION SYSTEM FOR AN INTERNAL COMBUSTION ENGINE

(75) Inventor: Kenichi Tsujimoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 524 days.

(21) Appl. No.: 12/663,526

(22) PCT Filed: Jun. 5, 2008

(86) PCT No.: PCT/JP2008/060719
§ 371 (c)(1),
(2), (4) Date: Dec. 8, 2009

(87) PCT Pub. No.: WO2008/150018
PCT Pub. Date: Dec. 11, 2008

(65) Prior Publication Data
US 2010/0154390 A1   Jun. 24, 2010

(30) Foreign Application Priority Data
Jun. 8, 2007   (JP) .................................. 2007-153168

(51) Int. Cl.
*F01N 3/00* (2006.01)
*F01N 3/10* (2006.01)

(52) U.S. Cl.
USPC .................................. 60/287; 60/299; 60/303

(58) Field of Classification Search
USPC ............ 60/286, 289, 301, 303, 296, 287, 299
See application file for complete search history.

(56) References Cited

U.S. PATENT DOCUMENTS

| 7,614,221 B2* | 11/2009 | Mori et al. ...................... 60/299 |
| 7,891,172 B2* | 2/2011 | Toshioka et al. ................ 60/286 |
| 2005/0178110 A1* | 8/2005 | Mital et al. ..................... 60/286 |
| 2006/0107653 A1 | 5/2006 | Nakatani |

FOREIGN PATENT DOCUMENTS

| JP | 2000 257419 | 9/2000 |
| JP | 2005 120938 | 5/2005 |
| JP | 2005 127257 | 5/2005 |
| JP | 2006 299900 | 11/2006 |
| JP | 2007 120452 | 5/2007 |

OTHER PUBLICATIONS

JP2005 127257A Machine Translation.*

* cited by examiner

*Primary Examiner* — Kenneth Bomberg
*Assistant Examiner* — Jason Sheppard
(74) *Attorney, Agent, or Firm* — Oblon, Spivak, McClelland, Maier & Neustadt, L.L.P.

(57) ABSTRACT

A reducing agent addition valve is arranged in a position in which at least part of a reducing agent added to an exhaust gas in an exhaust passage at a location upstream of a precatalyst reaches the precatalyst in the state of liquid, and the reducing agent is supplied in a more suitable state to an exhaust gas purification device which is arranged in the exhaust passage at a downstream side of the precatalyst. When the addition of the reducing agent is performed by the reducing agent addition valve, the flow rate of the exhaust gas flowing into the precatalyst is decreased so that at least part of the reducing agent, which has reached the precatalyst and has vaporized in the precatalyst, is caused to flow back.

7 Claims, 5 Drawing Sheets

EXHAUST GAS PURIFICATION SYSTEM FOR AN INTERNAL COMBUSTION ENGINE

CROSS-REFERENCE TO RELATED APPLICATIONS

This application is the national phase application under 35 U.S.C. §371 of PCT international application No. PCT/JP2008/060719 filed on 5 Jun. 2008, which claims priority to Japanese patent application No. 2007-153168 filed on 8 Jun. 2007, the entire contents of each of which are incorporated herein by reference.

TECHNICAL FIELD

The present invention relates to an exhaust gas purification system for an internal combustion engine which is provided with an exhaust gas purification device that is arranged in an exhaust passage of the internal combustion engine and is constructed to include a catalyst, and a precatalyst that has an oxidation function and is arranged in the exhaust passage at a location upstream of the exhaust gas purification device.

BACKGROUND ART

In case where an exhaust gas purification device constructed to include a catalyst is arranged in an exhaust passage, a precatalyst having an oxidation function may be arranged in an exhaust passage at a location upstream of the exhaust gas purification device. In this case, as such an exhaust gas purification device, there can be exemplified a NOx storage reduction catalyst (hereinafter referred to as a NOx catalyst), a particulate filter (hereinafter referred to as a filter) with a catalyst carried thereon, one having these NOx catalyst and filter in combination, and so on.

In addition, a reducing agent addition valve for adding a reducing agent to an exhaust gas may be further arranged in the exhaust passage at a location upstream of the precatalyst. In this case, when the exhaust gas purification device is raised in temperature or the air fuel ratio of an ambient atmosphere of the exhaust gas purification device is decreased, so as to recover the function of the exhaust gas purification device, the reducing agent is added to the exhaust gas by the reducing agent addition valve, whereby the reducing agent is supplied to the precatalyst and the exhaust gas purification device.

Japanese patent application laid-open No. 2005-127257 describes a technique in which a reforming catalyst for reforming the fuel supplied is arranged in an exhaust passage at an upstream side of a NOx catalyst. Further, Japanese patent application laid-open No. 2005-127257 describes a technique in which a reforming catalyst is disposed in a central portion of an exhaust passage, and a bypass circuit through which an exhaust gas flows is formed on an outer periphery of the reforming catalyst.

DISCLOSURE OF THE INVENTION

In case where the position in which a reducing agent addition valve is disposed in an exhaust passage is a position in which at least part of a reducing agent added to an exhaust gas reaches a precatalyst in the state of liquid, the reducing agent having reached the precatalyst in the liquid state vaporizes in the precatalyst. Then, a part of the reducing agent thus vaporized is oxidized in the precatalyst, but the remaining reducing agent having not been oxidized is supplied to an exhaust gas purification device.

The present invention has for its object to provide a technique in which in case where a reducing agent addition valve is arranged in a position in which at least part of a reducing agent added to an exhaust gas in an exhaust passage at a location upstream of a precatalyst reaches the precatalyst in the state of liquid, it is possible to supply the reducing agent in a more suitable state to an exhaust gas purification device which is arranged in the exhaust passage at a location downstream of the precatalyst.

In the present invention, when the addition of the reducing agent is performed by the reducing agent addition valve, the flow rate of the exhaust gas flowing into the precatalyst is decreased so that at least part of the reducing agent, which has reached the precatalyst and has vaporized in the precatalyst, is caused to flow back.

More specifically, an exhaust gas purification system for an internal combustion engine according to the present invention is characterized by including:

an exhaust gas purification device that is arranged in an exhaust passage of the internal combustion engine and is constructed to include a catalyst;

a precatalyst that is arranged in the exhaust passage at a location upstream of said exhaust gas purification device and has an oxidation function;

a reducing agent addition valve that is arranged in the exhaust passage at a location upstream of said precatalyst and adds a reducing agent to an exhaust gas when the reducing agent is supplied to said precatalyst and said exhaust gas purification device; and an exhaust gas flow rate control unit that controls a flow rate of the exhaust gas flowing into said precatalyst;

wherein said reducing agent addition valve is disposed in a position in which at least part of the reducing agent added to the exhaust gas reaches said precatalyst in the state of liquid, and wherein when the addition of the reducing agent is performed by said reducing agent addition valve, said exhaust gas flow rate control unit decreases the flow rate of the exhaust gas flowing into said precatalyst so that at least part of the reducing agent, which has reached said precatalyst and has vaporized in said precatalyst, is caused to flow back.

The volume of the reducing agent having reached the precatalyst in the state of liquid expands upon vaporization thereof in the precatalyst. A flow of the reducing agent in a direction opposite to the flow direction of the exhaust gas is caused to generate due to this expansion. As a result, it is possible to cause a part of the vaporized reducing agent to flow back by decreasing the flow rate of the exhaust gas flowing into the precatalyst at the time when the addition of the reducing agent is performed by the reducing agent addition valve.

Once the reducing agent having reached the precatalyst flows back, the time taken until said reducing agent reaches the exhaust gas purification device becomes longer as compared with the case in which no backflow has been generated. As a result, said reducing agent is more easily mixed with the exhaust gas until the time when the reducing agent reaches the exhaust gas purification device. In addition, the period during which the reducing agent is supplied to the exhaust gas purification device can be made longer. Thus, according to the present invention, the reducing agent can be supplied to the exhaust gas purification device in a more suitable state.

In the present invention, when the addition of the reducing agent is performed by the reducing agent addition valve, the exhaust gas flow rate control unit may control the flow rate of the exhaust gas so that the flow rate of the exhaust gas flowing into the precatalyst becomes smaller than the expansion rate of the reducing agent when the reducing agent having reached the precatalyst is vaporized to expand in the precatalyst.

According to this, it is possible to cause at least part of the reducing agent having been vaporized in the precatalyst to flow back.

In the present invention, when the exhaust gas purification device is raised in temperature, the reducing agent may be added to the exhaust gas by means of the reducing agent addition valve.

The reducing agent added from the reducing agent addition valve is oxidized in the precatalyst and the catalyst that is contained in the exhaust gas purification device. In the present invention, the reducing agent not oxidized in the precatalyst is supplied to the exhaust gas purification device in a state better mixed with the exhaust gas over a longer period of time. Therefore, the oxidation of the reducing agent in the catalyst contained in the exhaust gas purification device can be more facilitated. Accordingly, the temperature raising property of the exhaust gas purification device can be improved.

In the present invention, in case where the exhaust gas purification device is constructed to include a NOx catalyst, the reducing agent can be added to the exhaust gas by means of the reducing agent addition valve when NOx or SOx stored in the NOx catalyst is released and reduced.

In this case, the air fuel ratio of an ambient atmosphere of the NOx catalyst can be lowered over a longer period of time. Accordingly, it is possible to facilitate the release and reduction of NOx or SOx occluded in the NOx catalyst in a more efficient manner.

In the present invention, provision may be further made for a bypass passage that has one end thereof connected to the exhaust passage at a location upstream of the reducing agent addition valve and the other end thereof connected to the exhaust passage at a location downstream of the exhaust gas purification device, and a bypass control valve that controls the flow rate of the exhaust gas flowing in the bypass passage.

In the case of provision of the bypass passage and the bypass control valve as described above, the exhaust gas flow rate control unit may decrease the flow rate of the exhaust gas flowing into the precatalyst by increasing the flow rate of the exhaust gas flowing in the bypass passage by means of the bypass control valve.

In case where the flow rate of the exhaust gas flowing into the precatalyst is decreased by increasing the flow rate of the exhaust gas flowing in the bypass passage when the reducing agent is added from the reducing agent addition valve, there is a fear that if the flow rate of the exhaust gas flowing in the bypass passage is increased over a long period of time, the reducing agent, which has been vaporized in the precatalyst and has flown back, might flow into the bypass passage from the one end thereof.

Accordingly, in the case of increasing the flow rate of the exhaust gas flowing in the bypass passage by means of the bypass control valve, the flow rate of the exhaust gas flowing in the bypass passage may be temporarily increased at the time when the reducing agent is added from the reducing agent addition valve, and at the same time, the flow rate of the exhaust gas flowing in the bypass passage may be controlled to be substantially zero by means of the bypass control valve immediately after the addition of the reducing agent. According to such control, when the reducing agent is added from the reducing agent addition valve, the flow rate of the exhaust gas flowing into the precatalyst can be decreased, and at the same time, it is possible to suppress the reducing agent having flown back from coming into the bypass passage.

In addition, in the case of provision of the bypass passage and the bypass control valve as stated above, when the flow rate of the exhaust gas flowing into the precatalyst is decreased by means of the exhaust gas flow rate control unit, the flow rate of the exhaust gas flowing into the precatalyst may be controlled to such an extent that the reducing agent having been vaporized in the precatalyst and having flown back does not reach a connecting portion of the exhaust passage to which the one end of the bypass passage is connected. With such control, too, it is possible to suppress the reducing agent having flown back from coming into the bypass passage.

Moreover, in the present invention, even in the case of provision of the bypass passage and the bypass control valve, the exhaust gas flow rate control unit may decrease the flow rate of the exhaust gas flowing into the precatalyst according to a method other than increasing the flow rate of the exhaust gas flowing in the bypass passage.

In this case, when the exhaust gas flow rate control unit decreases the flow rate of the exhaust gas flowing into the precatalyst, the flow rate of the exhaust gas flowing in the bypass passage may be controlled to be substantially zero by means of the bypass control valve. According to such control, it is possible to suppress the reducing agent having flown back from coming into the bypass passage.

In the present invention, the precatalyst may be formed in such a manner that the exhaust gas flows between an outer peripheral surface of the precatalyst and an inner peripheral surface of the exhaust passage. In this case, the amount of exhaust gas flowing into the precatalyst is originally smaller as compared with the case in which the entire exhaust gas flowing into the exhaust gas purification device passes through the precatalyst. Therefore, when the reducing agent reaches the precatalyst and is vaporized to expand therein, a backflow of the reducing agent is liable to be generated. In addition, in this case, a part of the reducing agent, which has been vaporized in the precatalyst and has flown back, is supplied to the exhaust gas purification device while passing between the outer peripheral surface of the precatalyst and the inner peripheral surface of the exhaust passage.

BEST MODE FOR CARRYING OUT THE INVENTION

Hereinafter, a specific preferred embodiment of an exhaust gas purification system for an internal combustion engine according to the present invention will be described while referring to the accompanying drawings.

Embodiment 1

Figure 1:
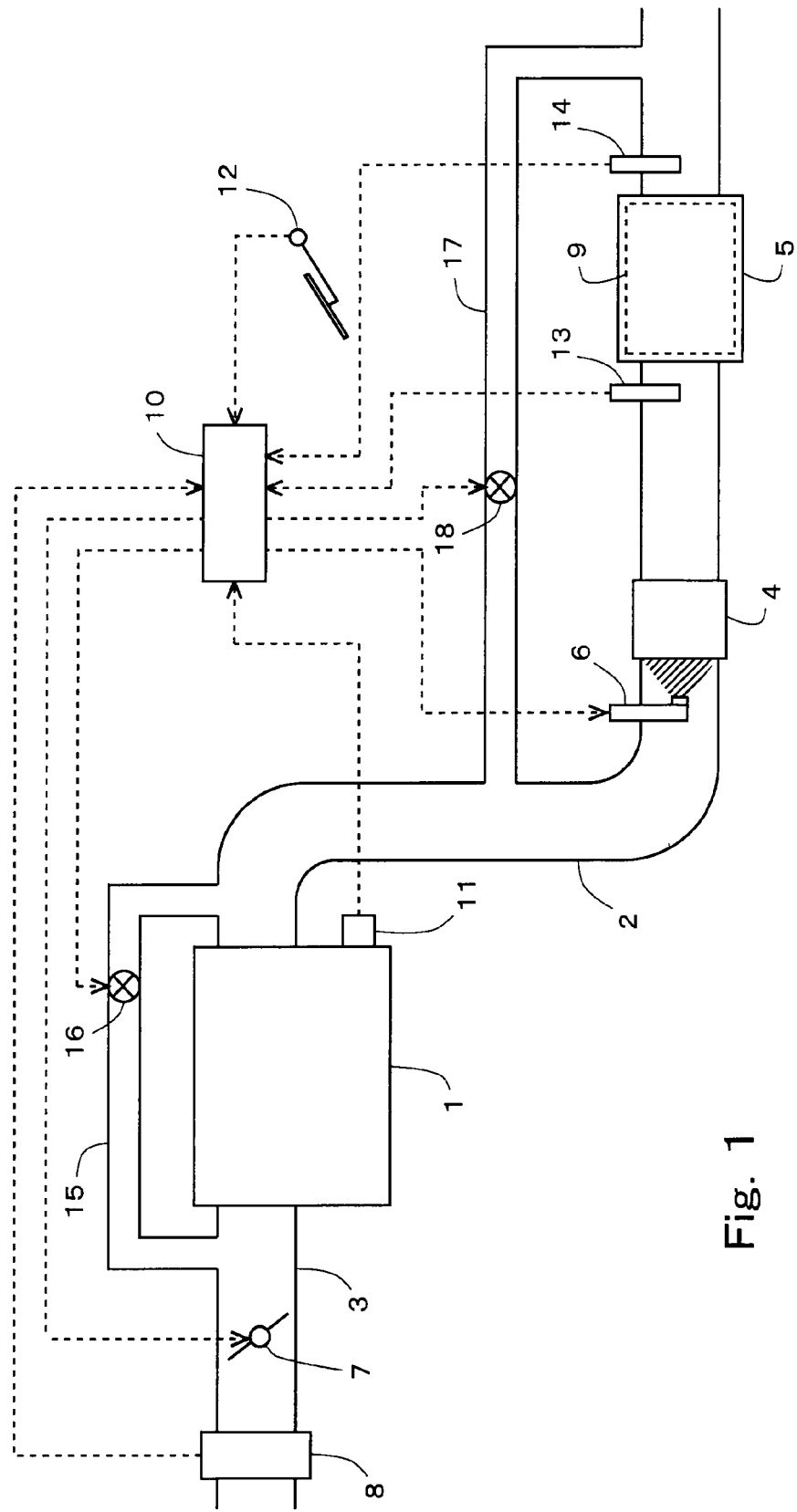
FIG. 1 is a first view showing the schematic construction of intake and exhaust systems of an internal combustion engine according to an embodiment of the present invention.

Schematic Construction of Intake and Exhaust Systems in an Internal Combustion Engine Here, reference will be made, by way of example, to a case where the present invention is applied to a diesel engine used for driving a vehicle. FIG. 1 is a view that shows the schematic construction of intake and exhaust systems of an internal combustion engine according to an embodiment of the present invention.

The internal combustion engine 1 is a diesel engine for driving a vehicle. An intake passage 3 and an exhaust passage 2 are connected with the internal combustion engine 1. A throttle valve 7 and an air flow meter 8 are arranged in the intake passage 3.

A filter 5 for collecting particulate matter (hereinafter referred to as PM) in an exhaust gas is arranged in the exhaust passage 2. A NOx catalyst 9 is carried by the filter 5. In this embodiment, the filter 5 and the NOx catalyst 9 together correspond to an exhaust gas purification device of the present invention.

An oxidation catalyst 4 is arranged in the exhaust passage 2 at a location upstream of the filter 5. Here, note that in this embodiment, the oxidation catalyst 4 corresponds to a pre-catalyst according to the present invention. Here, note that the oxidation catalyst 4 need only be a catalyst having an oxidation function, and may be, for example, a three way catalyst, a NOx catalyst or the like.

A fuel addition valve 6 for adding a reducing agent in the form of fuel to the exhaust gas is arranged in the exhaust passage 2 at an upstream side of the oxidation catalyst 4. The fuel addition valve 6 is disposed in proximity to the oxidation catalyst 4 with its fuel injection hole through which fuel is injected being in opposition to an upstream end face of the oxidation catalyst 4. Fuel is injected from the fuel injection hole of the fuel addition valve 6 in a conical shape (in FIG. 1, a hatched portion denotes the atomization of fuel). At least part of the fuel thus injected reaches the oxidation catalyst 4 in the state of liquid. In this embodiment, the fuel addition valve 6 corresponds to a reducing agent addition valve.

In this embodiment, an EGR passage 15 is arranged to introduce a part of the exhaust gas into the internal combustion engine 1 as an EGR gas. The EGR passage 15 has one end thereof connected to the exhaust passage 2 at an upstream side of the fuel addition valve 6, and the other end thereof connected to the intake passage 3 at a downstream side of the throttle valve 7. An EGR valve 16 for controlling the flow rate of the EGR gas is arranged in the EGR passage 15.

Further, in this embodiment, a bypass passage 17 is provided through which the exhaust gas flows bypassing the oxidation catalyst 4 and the filter 5. The bypass passage 17 has one end thereof connected to the exhaust passage 2 at the upstream side of the fuel addition valve 6, and the other end thereof connected to the exhaust passage 2 at a downstream side of the filter 5. A bypass control valve 18 for controlling the flow rate of the exhaust gas flowing in the bypass passage 17 is arranged in the bypass passage 17.

An air fuel ratio sensor 13 for detecting the air fuel ratio of the exhaust gas is arranged in the exhaust passage 2 between the oxidation catalyst 4 and the filter 5. In addition, a temperature sensor 14 for detecting the temperature of the exhaust gas is arranged in the exhaust passage 2 at a downstream side of the filter 5.

An electronic control unit (ECU) 10 for controlling the internal combustion engine 1 is provided in conjunction with the internal combustion engine 1 as constructed in the above-described manner. The air flow meter 8, the air fuel ratio sensor 13, the temperature sensor 14, a crank position sensor 11, and an accelerator opening sensor 12 are electrically connected to the ECU 10. The output signals of these sensors and meter are input to the ECU 10.

The crank position sensor 11 is a sensor that detects the crank angle of the internal combustion engine 1. The accelerator opening sensor 12 is a sensor that detects the degree of accelerator opening of the vehicle on which the internal combustion engine 1 is installed. The ECU 10 calculates the number of revolutions per minute of the internal combustion engine 1 (hereinafter simply referred to as the engine rotation number) based on the output value of the crank position sensor 11, and also calculates the load of the internal combustion engine 1 based on the output value of the accelerator opening sensor 12. In addition, the ECU 10 estimates the air fuel ratio of the ambient atmosphere of the filter 5 (i.e., the ambient atmosphere of the NOx catalyst 9) based on the output value of the air fuel ratio sensor 13, and also estimates the temperature of the filter 5 (i.e., the temperature of the NOx catalyst 9) based on the output value of the temperature sensor 14.

Also, the throttle valve 7, the fuel addition valve 6, the EGR valve 16, the bypass control valve 18 and fuel injection valves of the internal combustion engine 1 are electrically connected to the ECU 10. These valves are controlled by the ECU 10.

<Filter Regeneration Control>

In this embodiment, filter regeneration control is performed to remove the PM collected in the filter 5. The filter regeneration control according to this embodiment is achieved by adding fuel from the fuel addition valve 6 thereby to supply the fuel to the oxidation catalyst 4 and the filter 5. When the fuel supplied to the oxidation catalyst 4 is oxidized in the oxidation catalyst 4, the exhaust gas flowing into the filter 5 is raised in temperature by the heat of oxidation generated. As a result, the temperature of the filter 5 is raised. In addition, fuel having passed the oxidation catalyst 4 without being oxidized therein is supplied to the filter 5. When the fuel supplied to the filter 5 is oxidized in the NOx catalyst 9, the filter 5 is further raised in temperature by means of the oxidation heat. The temperature of the filter 5 can be raised to a temperature at which the oxidation of the PM therein is possible, by controlling the amount of fuel added from the fuel addition valve 6, as a result of which the PM collected in the filter 5 can be removed by the oxidation thereof.

In this embodiment, when the filter regeneration control is carried out, the control to decrease the flow rate of the exhaust gas flowing into the oxidation catalyst 4 is performed. As stated above, in this embodiment, at least part of the fuel added from the fuel addition valve 6 reaches the oxidation catalyst 4 in the state of liquid. The fuel having reached the oxidation catalyst 4 in the state of liquid is vaporized by the heat of oxidation generated in the oxidation catalyst 4. As the fuel in the liquid state is vaporized, the volume of the fuel expands.

At this time, when the flow rate of the exhaust gas flowing into the oxidation catalyst 4 is smaller than the speed or rate of expansion of the fuel, there occurs a backflow in the oxidation catalyst 4 in which at least a part of the vaporized fuel flows in a direction opposite to the direction in which the exhaust gas flows. Addition, a part of the fuel having been vaporized and having flown back in the oxidation catalyst 4 once flows out from the upstream end face of the oxidation catalyst 4, and thereafter flows again into the oxidation catalyst 4 along with the exhaust gas. That which has not been oxidized in the oxidation catalyst 4, among the fuel once having flown back in the oxidation catalyst 4 and the fuel once having flown out from the upstream end face of the oxidation catalyst 4 and again having flown into the oxidation catalyst 4, flows out from a downstream end face of the oxidation catalyst 4 together with the exhaust gas, and is supplied to the filter 5.

Once the fuel having reached the oxidation precatalyst 4 flows back, the time taken until the fuel reaches the filter 5 becomes longer as compared with the case in which no backflow has been generated. As a result, the fuel is more easily mixed with the exhaust gas during the time until when the fuel reaches the filter 5. In addition, as shown in FIG. 2, when the fuel having reached the oxidation catalyst 4 once flows back, it is possible to make longer the period during which fuel is supplied to the filter 5.

Figure 2:
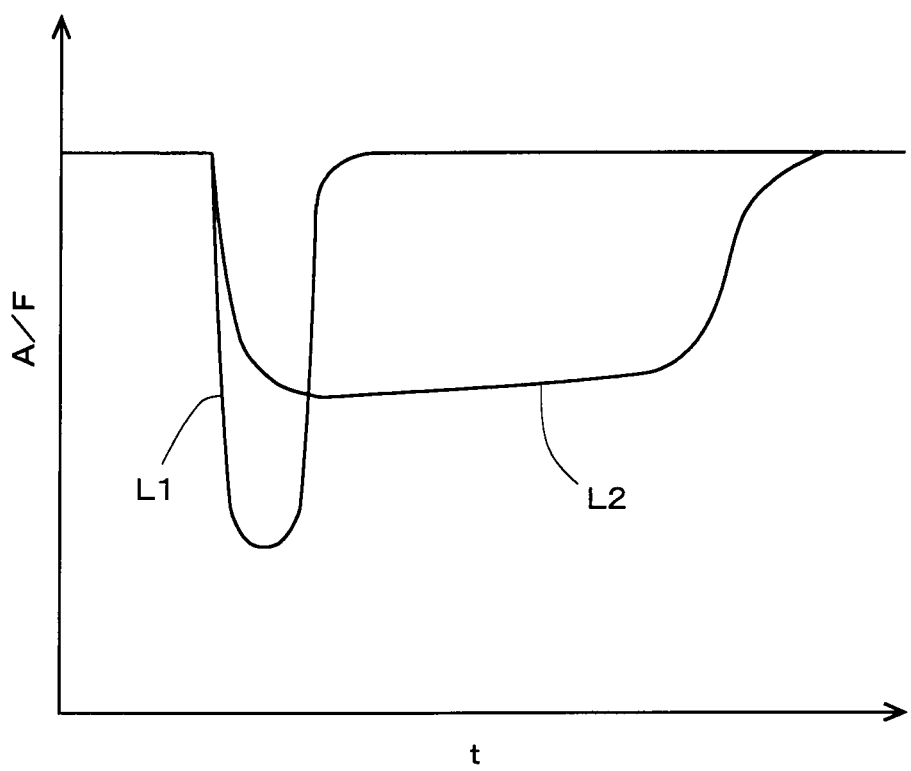
FIG. 2 is a graph showing the change of an air fuel ratio of an exhaust gas flowing into a filter at the time when fuel has been added from a fuel addition valve according to the embodiment of the present invention.

FIG. 2 is a graph showing the change of the air fuel ratio of the exhaust gas flowing into the filter 5 at the time when fuel has been added from the fuel addition valve 6. In FIG. 2, the axis of ordinate denotes the air fuel ratio A/F of the exhaust gas flowing into the filter 5, and the axis of abscissa denotes time t. In addition, curve L1 denotes a case where the backflow of the fuel having reached the oxidation catalyst 4 is not generated, and curve L2 denotes a case where the fuel having reached the oxidation catalyst 4 once flows back. As shown in FIG. 2, in case where the fuel having reached the oxidation catalyst 4 once flows back, the period in which the air fuel ratio of the exhaust gas flowing into the filter 5 becomes low is longer as compared with the case in which there occurs no backflow of fuel. In other words, it can be determined that the period in which fuel is supplied to the filter 5 is long.

As described above, fuel can be supplied to the filter in a more suitable state by causing the fuel having reached the oxidation catalyst 4 and having been vaporized therein to flow back. Accordingly, in this embodiment, by performing the control to increase the flow rate of exhaust gas when filter regeneration control is carried out, the flow rate of the exhaust gas flowing into the oxidation catalyst 4 is made smaller than the speed or rate of expansion at which fuel is vaporized to expand in the oxidation catalyst 4.

Figure 3:
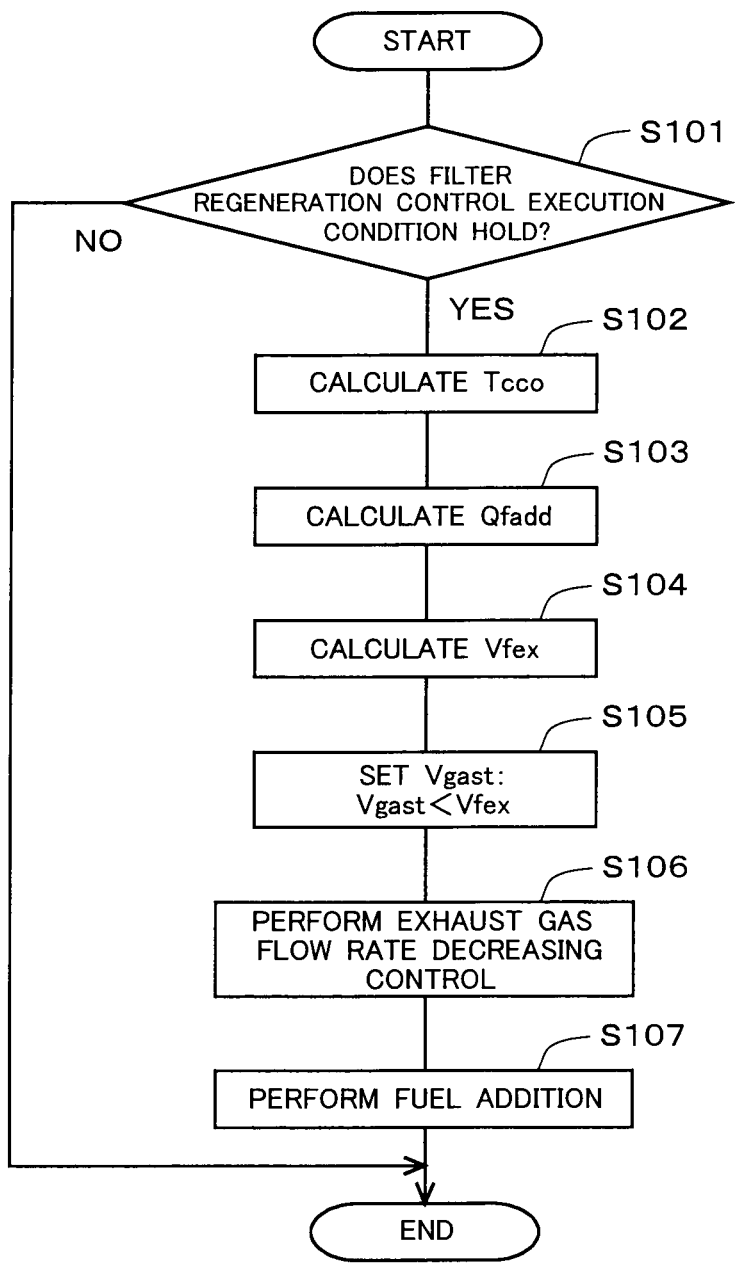
FIG. 3 is a first flow chart illustrating a routine for filter regeneration control according to the embodiment of the present invention.

Here, reference will be made to a routine for filter regeneration control according to this embodiment based on a flow chart shown in FIG. 3. This routine is beforehand stored in the ECU 10, and is repeatedly executed at a specified time interval during the operation of the internal combustion engine.

In this routine, first in step S101, the ECU 10 determines whether an execution condition for filter regeneration control holds. Here, note that when the amount of collection of the PM in the filter 5 becomes equal to or more than a predetermined amount of collection, it may be determined that the execution condition of filter regeneration control holds. The amount of collection of the PM in the filter 5 can be estimated from the history of the operating condition of the internal combustion engine 1 or the like. When a positive determination is made in S101, the ECU 10 advances to S102, whereas when a negative determination is made, the ECU 10 once terminates the execution of this routine.

In S102, the ECU 10 calculates the temperature Tcco of the oxidation catalyst 4 based on the operating condition of the internal combustion engine 1 or the like. Here, note that a temperature sensor may be arranged in the exhaust passage 2 immediately downstream of the oxidation catalyst 4, so that the temperature Tcco of the oxidation catalyst 4 can be estimated based on the detected value of the temperature sensor.

Then, the ECU 10 proceeds to step S103, where an amount of fuel Qfadd to be added from the fuel addition valve 6 required to raise the temperature of the filter 5 up to a target temperature in the filter regeneration control is calculated. The amount of fuel to be added Qfadd can be calculated based on a difference between the current temperature of the filter 5 and the target temperature, the operating condition of the internal combustion engine 1, and the temperature Tcco of the oxidation catalyst 4.

Thereafter, the ECU 10 proceeds to step S104, where the expansion rate Vfex of the fuel is calculated at the time when the fuel having been added from the fuel addition valve 6 and having reached the oxidation catalyst 4 in the state of liquid is vaporized to expand in the oxidation catalyst 4. The expansion rate Vfex of the fuel can be calculated based on the temperature Tcco of the oxidation catalyst 4 and the amount of fuel being added Qfadd.

Subsequently, the ECU 10 proceeds to step S105, where a target flow rate of exhaust gas Vgast is set which is a target value of the flow rate of the exhaust gas flowing into the oxidation catalyst 4 when exhaust gas flow rate decreasing control is performed in S106 to be described latter. At this time, the target flow rate of exhaust gas Vgast is set to a value that is smaller than the expansion rate Vfex of the fuel calculated in S104.

Then, the ECU 10 proceeds to step S106, where the flow rate of the exhaust gas flowing into the oxidation catalyst 4 is decreased to the target flow rate of exhaust gas Vgast by performing the exhaust gas flow rate decreasing control.

Here, as the exhaust gas flow rate decreasing control, there can be exemplified the control to decrease the amount of intake air of the internal combustion engine 1 by means of the throttle valve 7, the control to increase the amount of EGR gas by means of the EGR valve 16, the control to increase the flow rate of the exhaust gas flowing through the bypass passage 17 by means of the bypass control valve 18, and so on. When the amount of intake air in the internal combustion engine 1 is decreased, the flow rate of the exhaust gas in the internal combustion engine 1 is decreased, so the flow rate of the exhaust gas flowing into the oxidation catalyst 4 is consequentially decreased, too. In addition, when the amount of EGR gas is increased, the flow rate of the exhaust gas flowing through the exhaust passage 2 at the downstream side of its connecting portion with the EGR passage 15 is decreased, so the flow rate of the exhaust gas flowing into the oxidation catalyst 4 is decreased. Moreover, when the flow rate of the exhaust gas flowing through the bypass passage 17 is increased, the flow rate of the exhaust gas flowing through the exhaust passage 2 at the downstream side of its connecting portion with one end of the bypass passage 17 is decreased, so the flow rate of the exhaust gas flowing into the oxidation catalyst 4 is decreased. The exhaust gas flow rate control according to this embodiment can be achieved by either one of these control schemes or by any combination of these control schemes. In this embodiment, the ECU 10 executing the S106 corresponds to an exhaust gas flow rate control unit according to the present invention.

Subsequently, ECU 10 proceeds to S107, where it performs filter regeneration control by executing the addition of fuel from the fuel addition valve 6. Thereafter, the ECU 10 once terminates the execution of this routine.

According to the routine as stated above, the addition of fuel by means of the fuel addition valve 6 is carried out in a state where the flow rate of the exhaust gas flowing into the oxidation catalyst 4 is smaller than the expansion rate of vaporized fuel at the time when fuel is vaporized to expand in the oxidation catalyst 4. Therefore, when fuel reaches the oxidation catalyst 4 and is vaporized therein, there occurs a backflow of the fuel.

Accordingly, fuel can be supplied to the filter 5 in a more suitable manner. As a result, the oxidation of fuel in the NOx catalyst 9 carried by the filter 5 becomes liable to be facilitated. With this, the raising of the temperature of the filter 5, in particular, that of the upstream end face of the filter 5, can be improved, and so the temperature of the filter 5 can be raised up to the target temperature more quickly. In addition, the adhesion of fuel to the filter 5 can be suppressed. Further, fuel can be suppressed from passing through the filter 5 without being oxidized in the NOx catalyst 9.

Here, note that in this embodiment, if the fuel reaches up to the connecting portion of the exhaust passage 2 with the one end of the bypass passage 17 and flows into the bypass passage 17 at the time when the backflow of the vaporized fuel has occurred in the oxidation catalyst 4, the fuel might be discharged to the outside. Accordingly, in this embodiment, in case where the exhaust gas flow rate decreasing control is carried out by increasing the flow rate of the exhaust gas flowing through the bypass passage 17, the degree of opening of the bypass control valve 18 may be caused to temporarily increase in synchronization with the addition of fuel from the fuel addition valve 6, and immediately thereafter, the bypass passage 17 may be interrupted by the bypass control valve 18.

According to this, when fuel is added from the fuel addition valve 6, the flow rate of the exhaust gas flowing through the bypass passage 17 is temporary increased, and immediately thereafter the flow rate of the exhaust gas flowing through the bypass passage 17 becomes substantially zero. Accordingly, at the time when fuel is added from the fuel addition valve 6, it is possible to decrease the flow rate of the exhaust gas flowing into the oxidation catalyst 4, and at the same time it is possible to suppress the fuel having flown back from coming into the bypass passage. As a result, it is possible to suppress fuel from being discharged to the outside.

In addition, in this embodiment, when the target flow rate of exhaust gas Vgast is set, the target flow rate of exhaust gas Vgast may be set to such a value that the fuel having been vaporized in the oxidation catalyst 4 and having flown back does not reach up to the connecting portion of the exhaust passage 2 with the one end of the bypass passage 17. Such a target flow rate of exhaust gas Vgast can be calculated based on a distance from the connecting portion of the exhaust passage 2 with the one end of the bypass passage 17 to the oxidation catalyst 4 and the expansion rate Vfex of the fuel. According to this, too, it is possible to suppress the fuel having flown back from coming into the bypass passage 17.

Figure 4:
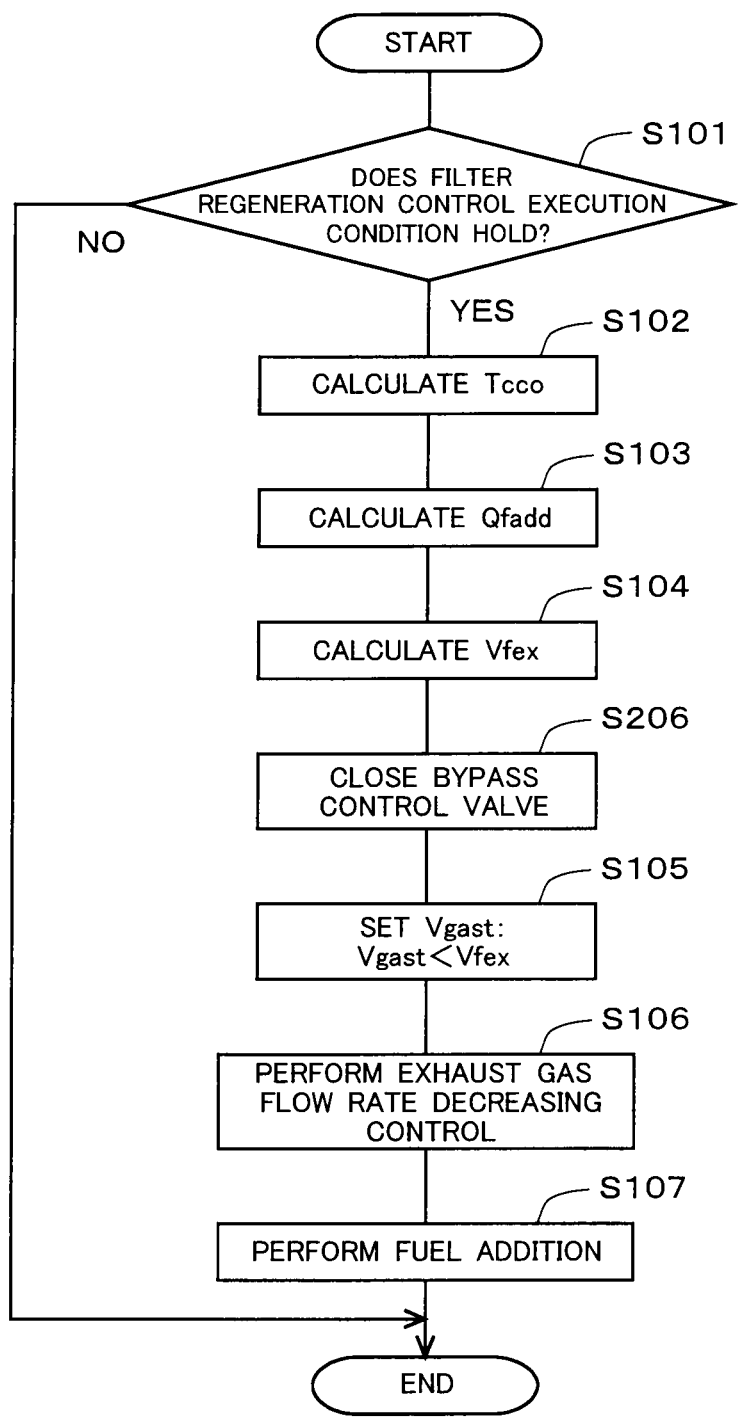
FIG. 4 is a second flow chart illustrating a routine for filter regeneration control according to the embodiment of the present invention.

Moreover, in this embodiment, the exhaust gas flow rate decreasing control may be carried out by other control methods or schemes than the control to increase the flow rate of the exhaust gas flowing through the bypass passage 17. Hereinafter, reference will be made to a routine for filter regeneration control in this case based on a flow chart shown in FIG. 4. Here, note that this routine is the routine shown in FIG. 3 with step S206 added thereto. Therefore, only step S206 will be explained, while omitting an explanation of the other steps. This routine is beforehand stored in the ECU 10, and is repeatedly executed at a specified time interval during the operation of the internal combustion engine.

In this routine, the ECU 10 proceeds to S206 after S105. In S206, the ECU 10 closes the bypass control valve 18 thereby to interrupt the bypass passage 17. Thereafter, the ECU 10 proceeds to S106. In this case, in S106, the ECU 10 executes the exhaust gas flow rate decreasing control according to a control method or scheme other than the control to increase the flow rate of the exhaust gas flowing through the bypass passage 17, so that the flow rate of the exhaust gas flowing into the oxidation catalyst 4 is decreased to the target flow rate of exhaust gas Vgast.

According to such a routine, when fuel is added from the fuel addition valve 6, the flow rate of the exhaust gas flowing through the bypass passage 17 becomes substantially zero. Accordingly, it is possible to suppress the fuel having been vaporized in the oxidation catalyst 4 and having flown back from coming into the bypass passage.

Figure 5:
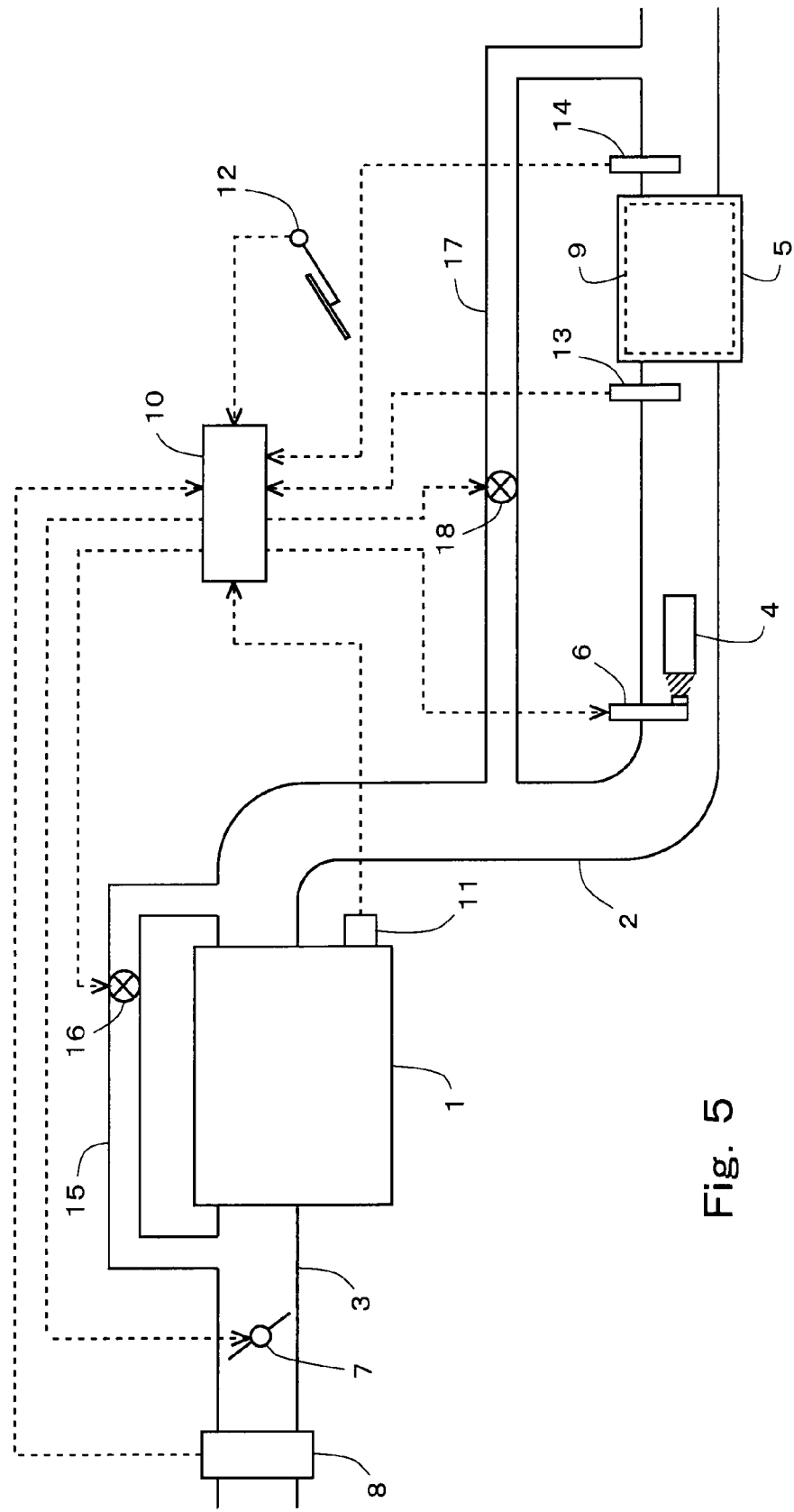
FIG. 5 is a second view showing the schematic construction of intake and exhaust systems of an internal combustion engine according to the embodiment of the present invention.

The oxidation catalyst 4 according to this embodiment may have an outer diameter which is smaller than an inner diameter of the exhaust passage 2, as shown in FIG. 5. In other words, the sectional area of the oxidation catalyst 4 in a direction perpendicular to the direction in which the exhaust gas flows may be smaller than the sectional area of the exhaust passage 2 in a direction perpendicular to the direction in which the exhaust gas flows. In the case of such a construction, the exhaust gas flows between an outer peripheral surface of the oxidation catalyst 4 and an inner peripheral surface of the exhaust passage 2. In addition, in such a construction, the fuel addition valve 6 and the oxidation catalyst 4 are arranged in such a manner that when fuel is injected from the fuel injection hole of the fuel addition valve 6, the upstream end face of the oxidation catalyst 4 is positioned in the midst of atomization of the fuel formed in a conical shape (in FIG. 5, a hatched portion denotes the atomization of the fuel).

In the case of the above-mentioned construction, the amount of exhaust gas flowing into the oxidation catalyst 4 is originally smaller as compared with the case in which the entire exhaust gas flowing into the filter 5 passes through the oxidation catalyst 4. Therefore, when fuel reaches the oxidation catalyst 4 and is vaporized to expand therein, a backflow of the fuel is liable to be generated.

In this embodiment, the description has been made by taking as an example the case where the fuel addition valve 6 is disposed in proximity to the oxidation catalyst 4 with its fuel injection hole being in opposition to the upstream end face of the oxidation catalyst 4. However, the fuel addition valve 6 may be arranged in any position as long as at least part of the fuel added from the fuel addition valve 6 reaches the oxidation catalyst 4 in the state of liquid.

Further, in this embodiment, when NOx reduction control to release and reduce the NOx stored in the NOx catalyst 9 or SOx poisoning recovery control to release and reduce the SOx stored in the NOx catalyst 9 is performed, the exhaust gas flow rate decreasing control may be carried out, similar to when the filter regeneration control is performed.

In the NOx reduction control, the addition of fuel by means of the fuel addition valve 6 is performed so as to lower the air fuel ratio of the ambient atmosphere of the NOx catalyst 9. Also, in the SOx poisoning recovery control, the addition of fuel by means of the fuel addition valve 6 is performed so as to raise the temperature of the NOx catalyst 9 and at the same time to lower the air fuel ratio of the ambient atmosphere of the NOx catalyst 9.

As stated above, by generating the backflow of the fuel vaporized in the oxidation catalyst 4 by performing the exhaust gas flow rate decreasing control according to this embodiment when the addition of fuel is performed by means of the fuel addition valve 6, fuel can be supplied to the NOx catalyst 9 in a state better mixed with the exhaust gas, and at the same time, the air fuel ratio of the ambient atmosphere of the NOx catalyst 9 can be lowered over a longer period of time. Accordingly, by performing the exhaust gas flow rate decreasing control upon execution of the NOx reduction control or the SOx poisoning recovery control, the release and reduction of NOx or SOx can be more facilitated. In addition, the adhesion of fuel to the filter 5 (the NOx catalyst 9) can be suppressed. Further, fuel can be suppressed from passing through the filter 5 without being oxidized in the NOx catalyst 9.

INDUSTRIAL APPLICABILITY

According to the present invention, in case where a reducing agent addition valve is arranged in a position in which at least part of a reducing agent added to an exhaust gas in an exhaust passage at a location upstream of a precatalyst reaches the precatalyst in the state of liquid, it is possible to supply the reducing agent to the exhaust gas purification device, which is arranged in the exhaust passage at a location downstream of the precatalyst, in a more suitable manner.

The invention claimed is:

1. An exhaust gas purification system for an internal combustion engine comprising:
    an exhaust gas purification device that is arranged in an exhaust passage of the internal combustion engine and including a catalyst;
    a precatalyst that is arranged in the exhaust passage at a location upstream of said exhaust gas purification device and has an oxidation function;
    a reducing agent addition valve that is arranged in the exhaust passage at a location upstream of said precatalyst and adds a reducing agent to an exhaust gas when the reducing agent is supplied to said precatalyst and said exhaust gas purification device, wherein said reducing agent addition valve is disposed in a position in which at least part of the reducing agent added to the exhaust gas reaches said precatalyst in the state of liquid; and
    an electronic control unit including a routine, the routine including
        calculating an expansion rate of the reducing agent when the reducing agent having reached said precatalyst is vaporized to expand in said precatalyst,
        setting a target value of the flow rate of the exhaust gas flowing into said precatalyst to be less than the calculated expansion rate of the reducing agent, and
        when the addition of the reducing agent is performed by said reducing agent addition valve, decreasing the flow rate of the exhaust gas flowing into said precatalyst based on the target value of the flow rate of the exhaust gas flowing into said precatalyst so that at least part of the reducing agent, which has reached said precatalyst and has vaporized in said precatalyst, is caused to flow back.

2. The exhaust gas purification system for an internal combustion engine as set forth in claim 1, wherein said electronic control unit controls said reducing agent addition valve to add the reducing agent into the exhaust gas when the temperature of said exhaust gas purification device is raised.

3. The exhaust gas purification system for an internal combustion engine as set forth in claim 1,
    wherein said exhaust gas purification device is constructed to include a NOx storage reduction catalyst; and
    wherein when the release and reduction of NOx or SOx stored in said NOx storage reduction catalyst is caused to be released and reduced, said reducing agent addition valve adds the reducing agent into the exhaust gas.

4. The exhaust gas purification system for an internal combustion engine as set forth in claim 1, further comprising:
    a bypass passage that has its one end connected to said exhaust passage at a location upstream of said reducing agent addition valve and its other end connected to said exhaust passage at a location downstream of said exhaust gas purification device; and
    a bypass control valve that controls the flow rate of the exhaust gas flowing through said bypass passage;
    wherein said electronic control unit decreases the flow rate of the exhaust gas flowing into said precatalyst by increasing the flow rate of the exhaust gas flowing through said bypass passage by means of said bypass control valve.

5. The exhaust gas purification system for an internal combustion engine as set forth in claim 4, wherein said routine includes a step of increasing the flow rate of the exhaust gas flowing through said bypass passage by means of said bypass control valve when the reducing agent is added from said reducing agent addition valve, and
    immediately after decreasing the flow rate of the exhaust gas flowing into said precatalyst, said electronic control unit controls the flow rate of the exhaust gas flowing through said bypass passage to be substantially zero by means of said bypass control valve.

6. The exhaust gas purification system for an internal combustion engine as set forth in claim 1, further comprising:
    a bypass passage that has its one end connected to said exhaust passage at a location upstream of said reducing agent addition valve and its other end connected to said exhaust passage at a location downstream of said exhaust gas purification device; and
    a bypass control valve that controls the flow rate of the exhaust gas flowing through said bypass passage;
    wherein when said electronic control unit decreases the flow rate of the exhaust gas flowing into said precatalyst, the flow rate of the exhaust gas flowing into said precatalyst is controlled to such an extent that the reducing agent having been vaporized in said precatalyst and having flown back does not reach a connecting portion of said exhaust passage to which one end of said bypass passage is connected.

7. The exhaust gas purification system for an internal combustion engine as set forth in claim 1, wherein said precatalyst is formed in such a manner that the exhaust gas flows between an outer peripheral surface of said precatalyst and an inner peripheral surface of said exhaust passage.

* * * * *